United States Patent
Li et al.

(10) Patent No.: US 12,461,274 B2
(45) Date of Patent: Nov. 4, 2025

(54) METHOD FOR OBTAINING GEOLOGICAL HETEROGENEITY TRENDS OF A GEOLOGICAL FORMATION

(71) Applicant: SAUDI ARABIAN OIL COMPANY, Dhahran (SA)

(72) Inventors: Yupeng Li, Beijing (CN); Maolin Luo, Dhahran (SA); Shouxiang Ma, Dhahran (SA); Peng Lu, Dhahran (SA); Christopher Ayadiuno, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/247,505

(22) PCT Filed: Mar. 23, 2022

(86) PCT No.: PCT/CN2022/082500
§ 371 (c)(1),
(2) Date: Mar. 31, 2023

(87) PCT Pub. No.: WO2023/178553
PCT Pub. Date: Sep. 28, 2023

(65) Prior Publication Data
US 2024/0361490 A1   Oct. 31, 2024

(51) Int. Cl.
*G01V 11/00* (2006.01)
*G06F 30/28* (2020.01)

(52) U.S. Cl.
CPC ........... *G01V 11/002* (2013.01); *G06F 30/28* (2020.01)

(58) Field of Classification Search
CPC ... G01V 11/002; G06F 30/28; G06F 2218/16; G06F 18/23211; G06F 18/254; G06F 17/16; E21B 2200/20
See application file for complete search history.

(56) References Cited

U.S. PATENT DOCUMENTS

| | | | |
|---|---|---|---|
| 10,430,725 B2 | 10/2019 | Anderson et al. | |
| 2016/0349389 A1 | 12/2016 | Walters et al. | |
| 2021/0247537 A1* | 8/2021 | Zhu | G01V 1/48 |

FOREIGN PATENT DOCUMENTS

| | | |
|---|---|---|
| CN | 105426626 A | 3/2016 |
| CN | 109272029 A | 1/2019 |

(Continued)

OTHER PUBLICATIONS

T. Alqurashi et al., "Clustering ensemble method", International Journal of Machine Learning and Cybernetics, Published online Jan. 16, 2018 (18 pages).

(Continued)

*Primary Examiner* — Mi'schita' Henson
(74) *Attorney, Agent, or Firm* — Osha Bergman Watanabe & Burton LLP

(57) ABSTRACT

A method for obtaining geological heterogeneity trends of a geological formation, including the steps: drilling wells ($w_1$, $w_2$, $w_3$, $w_4$, $w_5$) that penetrate the formation, acquiring well logs (log 1, log 2) for each well ($w_1$, $w_2$, $w_3$, $w_4$, $w_5$) as function of depth interVals ($D_k$) of the respectiVe well, determining a third degree tensor ($T_{k,\,m,\,n}$), where a z-dimension denotes the depths, a x-dimension denotes the well logs, and a y-dimension denotes the wells, extracting matrices ($L^1_{k,m}$, $L^2_{k,m}$, ..., $L^M_{k,n}$) from the tensor ($T_{k,\,m,\,n}$), clustering the matrices ($L^1_{k,n}$, $L^2_{k,n}$, ..., $L^M_{k,n}$) based on the characteristics of the corresponding well logs (log 1, log 2) to a clustering result matrix, aggregating the clustering result matrix to a cluster ensemble ($\pi_1$, $\pi_2$, ..., $\pi_M$), and spatial partitioning the cluster ensemble ($\pi_1$, $\pi_2$, ..., $\pi_M$) to a map that shows the geological heterogeneity trends associated with cluster types of the wells ($w_1$, $w_2$, $w_3$, $w_4$, $w_5$).

15 Claims, 16 Drawing Sheets

(56) References Cited

FOREIGN PATENT DOCUMENTS

CN 110674841 A 1/2020
CN 113503156 A 10/2021

OTHER PUBLICATIONS

A. Banerjee et al., "A new method for weighted ensemble clustering and coupled ensemble Selection", Tylor & Francis, Published online Jan. 7, 2021, pp. 1-22 (24 pages).
A. Topchy et al., "A Mixture Model for Clustering Ensembles", SIAM Publication Library, 2004, pp. 379-390 (12 pages).
A. Ali et al., "Characterization of well logs using K-mean cluster analysis", Journal of Petroleum Exploration and Production Technolog, 2020, vol. 10, pp. 2245-2256 (12 pages).
S. Ameri et al., "Permeability Evaluation in Heterogeneous Formations Using Geophysical Well Logs and Geological Interpretations", Paper presented at the SPE Western Regional Meeting, Anchorage, Alaska, May 1993, SPE-26060-MS, pp. 1-10 (10 pages).
J. L. Baldwin et al., "Application Of A Neural Network To the Problem of Mineral Identification From Well Logs", The Log Analyst, Sep.-Oct. 1990, vol. 31, No. 05, pp. 279-293 (15 pages).
Z. Huang, "Extensions to the k-Means Algorithm for Clustering Large Data Sets with Categorical Large Data Sets with Categorical Values", Data Mining and Knowledge Discovery 2, 1998, pp. 283-304 (22 pages).
N. Iam-On et al., "LinkCluE: a MATLAB Package for Link-Based Cluster Ensembles", Journal of Statistical Software, 2010, vol. 36, Issue. 9, pp. 1-36 (36 pages).
A. Sharma et al., "2D-EM clustering approach for high-dimensional data through folding feature vectors", BMC Bioinformatics, 2017, vol. 18, (Suppl 16),No. 547, pp. 195-209 (15 pages).
X. Wu et al., "Incremental correlation of multiple well logs following geologically optimal neighbors", Interpretation, 2018, vol. 6, No. 3,T713-T722, pp. 1-10 (11 pages).
G. Y. Lu et al., ", G. Y., & Wong D., D. (2008). An adaptive inverse-distance weighting spatial interpolation technique", Computers and Geosciences, 2008, vol. 34, No. 9, pp. 1044-1055 (12 pages).
J. Luo et al., "Surface Electromyography Classification Method Based on Temporal Two-Dimensionalization and Convolution Feature Fusion", Pattern Recognition and Artigicial Intelligence, Jul. 31, 2020, vol. 33, No. 7, ISSN:1003-6059, pp. 588-597 (12 pages).
International Search Report issued in corresponding International Application No. PCT/CN2022/082500, mailed Nov. 23, 2022 (4 pages).
Written Opinion issued in corresponding International Application No. PCT/CN2022/082500, mailed Nov. 4, 2022 (4 pages).
J. Feng et al., "The Quantitative Discrimination of Architectural Elements of Fluvial Reservoir", Acta Sedimentologica Sinica, Apr. 30, 2007, vol. 25, No. 2, ISSN:1000-0550, pp. 207-213 (7 pages).
A. J. Rudman et al., "Stratigraphic Correlation of Well Logs by Computer Techniques", AAPG Bulletin, 1973, vol. 57, No. 3, pp. 577-588 (12 pages).
R. C. Selley. (1976). "environmental analysis of North Sea sediments", American Association of Petroleum Geologists Bulletin, Feb. 1976, vol. 60, No. 2, pp. 184-195 (12 pages).

* cited by examiner

METHOD FOR OBTAINING GEOLOGICAL HETEROGENEITY TRENDS OF A GEOLOGICAL FORMATION

CROSS-REFERENCE TO RELATED APPLICATION

This application is a national phase application of PCT/CN2022/082500, filed on Mar. 23, 2022. The contents of this application are hereby incorporated by reference in their entirety.

BACKGROUND

A geological formation is a rock with geological properties that characterize the formation. To obtain the geological properties of the formation, a well is drilled that penetrates the formation. A detailed record of the well is obtained by well logging.

Geologic data from well logging (well log data) are used to explore wells and oil production in the petroleum industry. Well log data are obtained by running various logging devices in wells to detect the geological properties of the formation and/or properties of a fluid within the formation. The properties of a formation may be naturally occurring radioactivity, e.g. gamma ray, or other natural and induced formation signals such as spontaneous potential, bulk density, neutron porosity, acoustic, and resistivity. The well log data is used for interpretations for quantitative formation evaluation and commonly annotations on logs such as stratigraphic tops, which are widely used as the standard graphic base for subsurface cross sections of properties.

Heterogeneity is the variation of rock properties as function of the location in a reservoir or formation. The qualitative and quantitative analysis of the properties in the well logs may effectively reflect the gross geologic variations and thus the heterogeneous characters of the formation. Due to the horizontal and vertical geologic variations in a formation, there is a need to group the wells with those variations based on the nature of the properties in the well logs. Different groups of wells may reflect different underground heterogeneous zones or formations.

Accordingly, there exists a need for a method for obtaining geological heterogeneity trends of a geological formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for obtaining geological heterogeneity trends of a geological formation, comprising the steps: drilling wells that penetrate the formation, acquiring well logs for each well as function of depth intervals of the respective well, determining a third degree tensor, where a z-dimension denotes the depths, a x-dimension denotes the well logs, and a y-dimension denotes the wells, extracting matrices from the tensor, clustering the matrices based on the characteristics of the corresponding well logs to a clustering result matrix, aggregating the clustering result matrix to a cluster ensemble, and spatial partitioning the cluster ensemble to a map that shows the geological heterogeneity trends associated with cluster types of the wells.

Other aspects and advantages of the claimed subject matter will be apparent from the following description and the appended claims.

DETAILED DESCRIPTION

Embodiments disclosed herein relate to a clustering ensemble method for quick well clustering based on well log data. Clustering wells based on their similar log curve features can reveal hidden heterogeneous characteristics. The results can facilitate further reservoir studies, such as petrophysical and geological modeling and reservoir simulation. Multiple logs or log curves are usually measured along the well path. Extracting patterns from these log curves for a certain formation is a challenge using the traditional clustering methods.

In embodiments disclosed herein, wells are clustered based on multiple well logs data along certain well path intervals defined by stratigraphic tops. The method for doing this involves three major steps: base clustering, clustering ensemble and spatial partitioning at the reservoir scale. Base clustering is to cluster all the wells based on their individual well log curve. Then, the clustering ensemble clusters the wells by considering multiple well log curves together. The spatial partitioning is to perform a 3D spatial compartmentalization of the underlying domains according to well cluster types. Finally, clustering of all the wells in a target area may be obtained.

Figure 15:
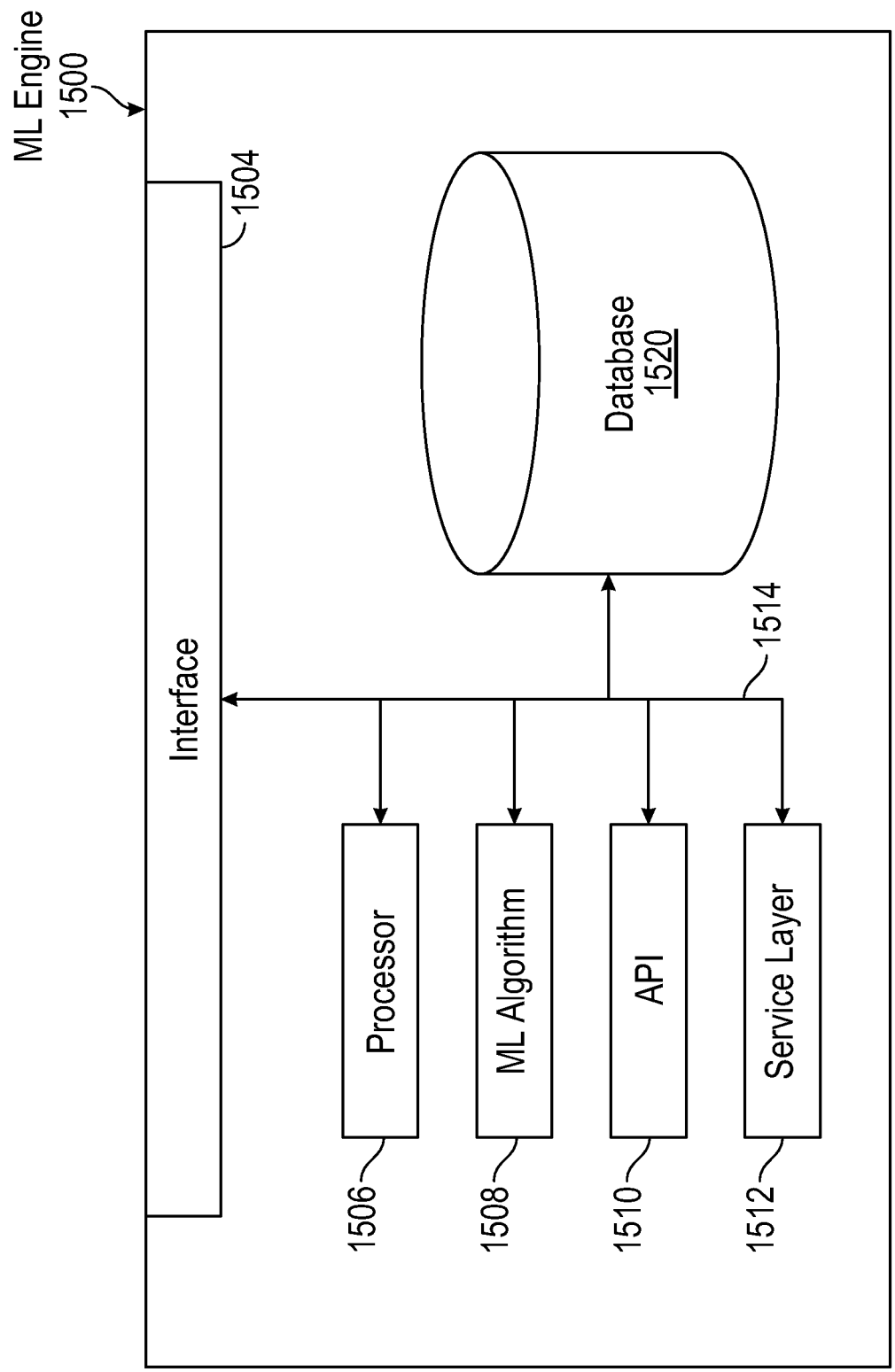
FIG. 15 illustrates the ML engine for performing the method for obtaining geological heterogeneity trends of a geological formation

In one or more embodiments, the method for obtaining geological heterogeneity trends of a geological formation is performed by computer software programs for fast and robust well clustering. Such computer software programs may be executed on any suitable device, such as shown in FIG. 15.

Figure 1:
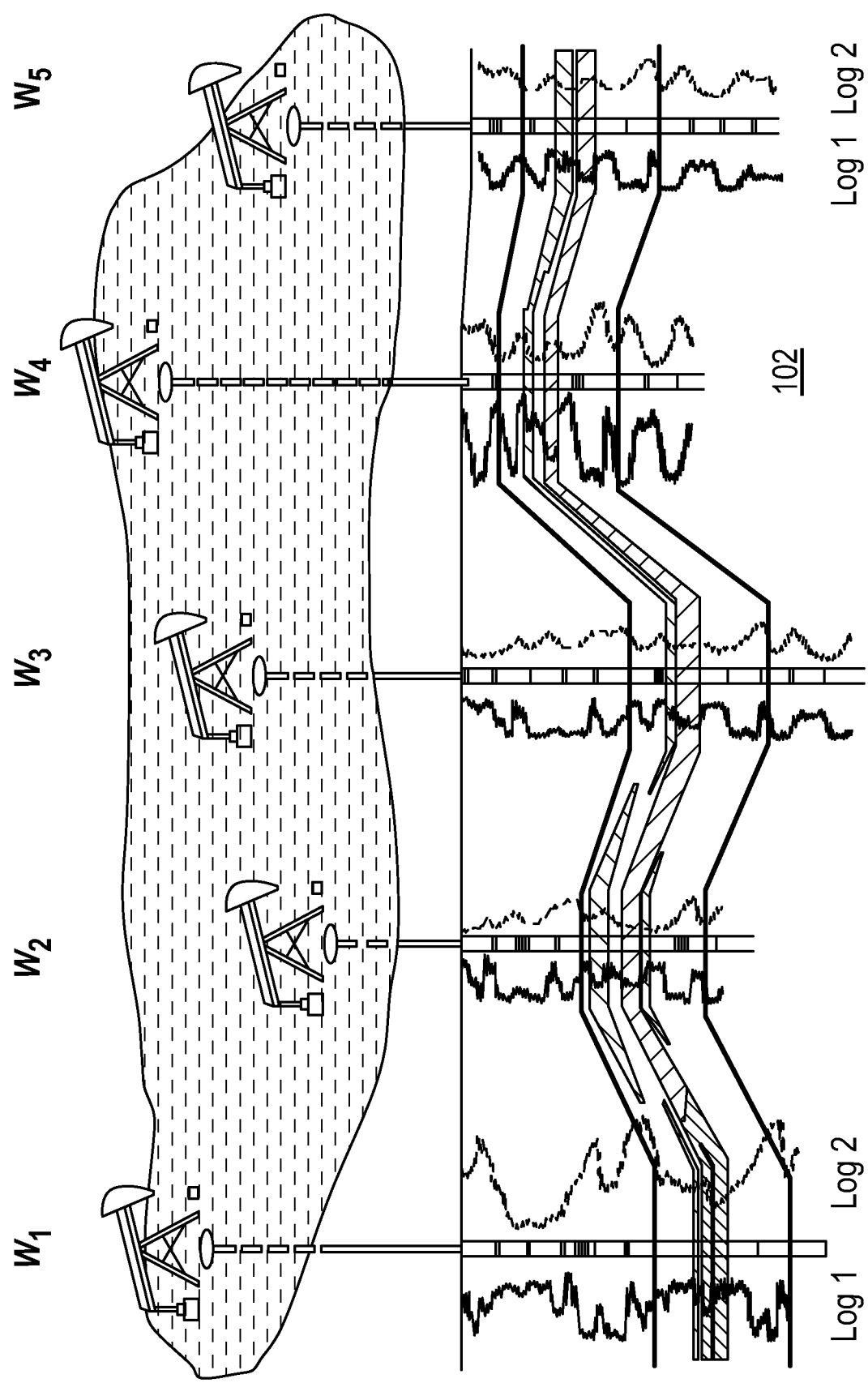
FIG. 1 shows a reservoir penetrated by five wells in accordance with one or more embodiments.
Figure 2:
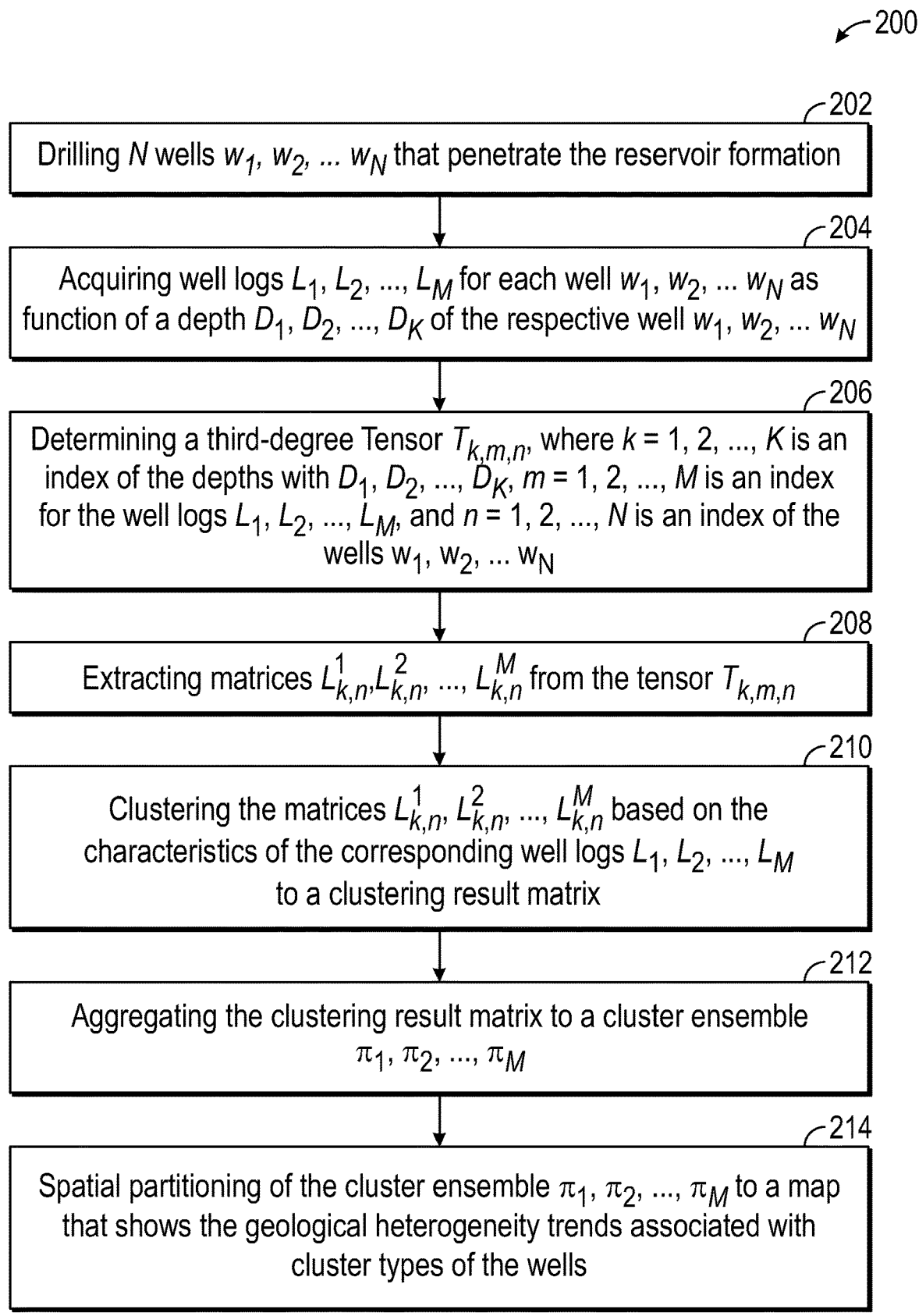
FIG. 2 illustrates a flowchart for obtaining geological heterogeneity trends of a geological formation in accordance with one or more embodiments.

FIG. 1 shows a reservoir 102 penetrated by five wells $w_1$, $w_2$, $w_3$, $w_4$, $w_5$. Two different types of well logs log 1 and log 2 are obtained from each well $w_1$, $w_2$, $w_3$, $w_4$, $w_5$. Each well may have several different measured well log curves for a certain target formation as shown in FIG. 2. The qualitative and quantitative log feature analysis of the logs effectively reflect the gross geologic variations and thus the heterogeneous characters of the formation. Due to the horizontal and vertical geologic variations, there is a need to group those variations based on the nature of geologic information carried by the logs, acquired with wireline or other means such as logging while drilling (LWD). Different groups of wells may reflect different underground heterogeneous zones or formations.

FIG. 2 illustrates a flowchart 200 of the method steps for obtaining geological heterogeneity trends of a geological formation. The geological heterogeneity trends have a wide range of applications, including reservoir characterization, geological modeling, petrophysical modeling, reservoir performance dynamic simulation, as well as reservoir engineering and management.

In step 202, N wells $w_1$, $w_2$, ..., $w_N$ are drilled that penetrate the formation. FIG. 2 shows a reservoir 202 penetrated by five wells $w_1$, $w_2$, $w_3$, $w_4$, $w_5$.

In step 204, well log curves log 1, log 2, ..., log M are acquired for each well $w_1$, $w_2$, ..., $w_N$ as function of a depth $D_1$, $D_2$, ..., $D_K$ of the respective well $w_1$, $w_2$, ..., $w_N$. The well log curves are measured along the depth of each well, even if a well is embodied vertical, deviated, or horizontal. The value of a property of the formation is recorded as a function of the depth of the logging device in the well. The well log data are then plotted in well log curves that show the value of the properties versus the depth. FIG. 2 shows different types of well log curves $L_1$, $L_2$, ..., $L_M$ obtained from each well $w_1$, $w_2$, $w_3$, $w_4$, $w_5$. In one or more embodiments, the well log curves $L_1$, $L_2$, ..., $L_M$ are acquired by wireline or logging while drilling (LWD).

Figure 4:
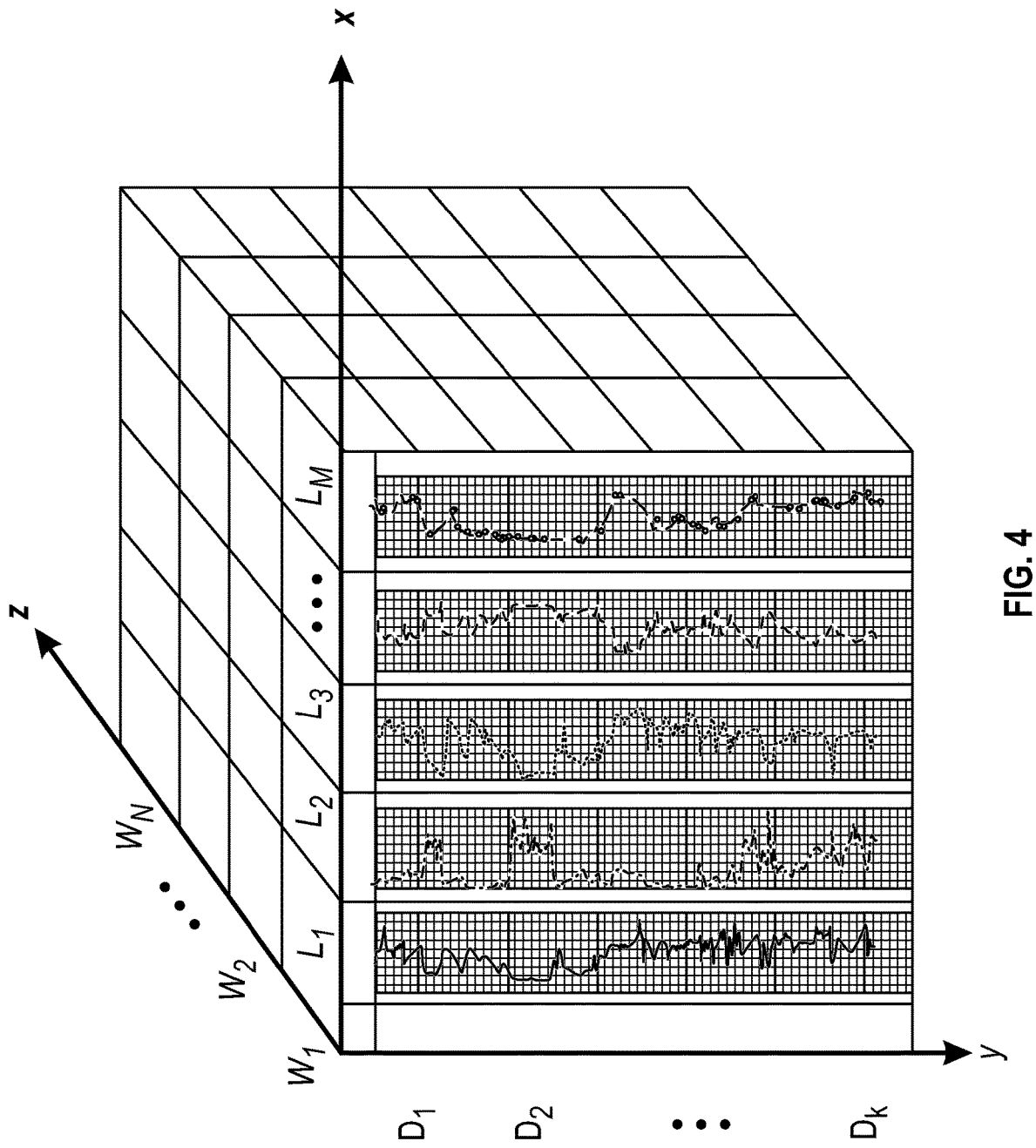
FIG. 4 shows a third degree tensor ($T_{k,m,n}$) in accordance with one or more embodiments.

In step 206, a third-degree Tensor $T_{k,m,n}$ is determined, where k=1, 2, ..., K is an index of the depths with $D_1$, $D_2$, ..., $D_K$, m=1, 2, ..., M is an index for the well logs $L_1$, $L_2$, ..., $L_M$, and n=1, 2, ..., N is an index of the wells $w_1$, $w_2$, ..., $w_N$. The well logs $L_1$, $L_2$, ..., $L_M$ are values of the well log curve log 1, log 2, ..., log M at the depth $D_1$, $D_2$, ..., $D_K$ of the respective well $w_n$. FIG. 4 shows a third degree tensor $T_{k,m,n}$.

In step 208, matrices $L_{k,n}^1$, $L_{k,n}^2$, ..., $L_{k,n}^M$ are extracted from the tensor $T_{k,m,n}$. Each matrix $L_{k,n}^m$ is extracted from the tensor $T_{k,m,n}$. For example, $L_{k,n}^1$ is equal to $T_{k,1,n}$, $L_{k,n}^2$ is equal to $T_{k,2,n}$, ..., and $L_{k,n}^M$ is equal to $T_{k,M,n}$.

In step 210, the matrices $L_{k,n}^1$, $L_{k,n}^2$, ..., $L_{k,n}^M$ are clustered based on the characteristics of the corresponding well logs $L_1$, $L_2$, ..., $L_M$ (base clustering) to a clustering result matrix. The base clustering of the matrices $L_{k,n}^1$, $L_{k,n}^2$, ..., $L_{k,n}^M$, is a matrix feature extraction and clustering task, which is a challenge to the clustering. In one or more embodiments, the base clustering comprises k-means algorithm. The base clustering of the matrices $L_{k,n}^1$, $L_{k,n}^2$, ..., $L_{k,n}^M$ is based on the similarity of the well logs and reveals hidden heterogeneous characteristics. The results facilitate further reservoir studies, such as petrophysical and geological modeling and reservoir simulation.

Extracting patterns from the well logs while drilling the well is a challenge for the base clustering. The wells are clustered based on multiple well logs along certain depth intervals defined by historic analysis of layers of sedimentary rock called strata (stratigraphic analysis) of markers of geologic layers (tops).

The base clustering of the wells is conducted based on the analysis of the type of the well log along the depth. The challenge is that the number N of wells is much smaller than the depth intervals $D_k$. For example, a value of a well log is measured at depths of every 0.125 meter (0.5 feet) of the well. In one or more embodiments, the depth intervals $D_k$ is around 1000s, while the well number is around 100s. An unsupervised multivariate data reduction, such as principal component analysis (PCA), is used to reduce the dimension of the depth intervals $D_k$. Furthermore, the matrices are huge mathematical matrices, even for vertical wells. Furthermore, the number N of the wells is much smaller than the numbers of the well logs M.

Since the base clustering is done according to the different types of well logs $L_m$, the N×K matrix $L_{k,n}^m$ is to be to be base clustered for each type of well log $L_m$. Each of the N wells comprises K depths.

In one or more embodiments, the base clustering is a machine learning (ML) technique. ML clusters the matrices $L_{k,n}^m$ according to the well logs $L_m$ as unsupervised learning for statistical data analysis. Data points in the same group have similar properties and/or features, while data points in different groups should have highly dissimilar properties and/or features.

Table 1 shows an example of a N×K matrix $L_{k,n}^m$ of a well log $L_m$, where m is the type of the well log, e.g., gamma radiation (GR), N=15 is the number of wells to be clustered, and K=89 is the depth of the wells.

TABLE 1

An example of a N × K matrix $L_{k,n}^m$, with N = 15 and K = 89.

| n | $D_1$ | $D_2$ | $D_3$ | $D_4$ | $D_5$ | | $D_{89}$ |
|---|---|---|---|---|---|---|---|
| 1 | 8.936 | 9.143153 | 9.177482 | 9.146391 | 9.073243 | ... | 7.959 |
| 2 | 7.644 | 7.646959 | 7.597866 | 7.56815 | 7.621289 | ... | 8.193 |
| 3 | 8.352 | 8.43842 | 8.464696 | 8.459282 | 8.452808 | ... | 7.782 |
| 4 | 8.229 | 8.176308 | 8.181622 | 8.258484 | 8.256728 | ... | 8.804 |
| 5 | 8.211 | 8.078801 | 7.999436 | 7.951944 | 8.006787 | ... | 8.225 |
| 6 | 7.757 | 7.804761 | 7.821874 | 7.798978 | 7.754996 | ... | 9.299 |
| 7 | 8.808 | 8.686874 | 8.669926 | 8.799988 | 8.819263 | ... | 8.553 |
| 8 | 7.363 | 7.497409 | 7.564005 | 7.593902 | 7.574305 | ... | 8.53 |
| 9 | 9.086 | 9.179404 | 8.960364 | 8.943797 | 8.984507 | ... | 8.796 |
| 10 | 8.26 | 8.421 | 8.544 | 8.645212 | 8.529 | ... | 8.644 |
| 11 | 8.328 | 8.260026 | 8.150307 | 8.200241 | 8.145491 | ... | 8.808 |
| 12 | 9.366 | 9.192261 | 9.319 | 9.315 | 9.252 | ... | 8.822 |
| 13 | 8.939 | 8.793447 | 8.724068 | 8.595155 | 8.829165 | ... | 8.262 |
| 14 | 9.16 | 9.023854 | 8.899685 | 8.765882 | 8.768025 | ... | 8.421 |
| 15 | 9.032 | 9.467102 | 9.258101 | 8.861262 | 8.941784 | ... | 9.012 |

The N×K matrix $L_{k,n}^m$, according to table 1 needs to be clustered as a base for final clustering (for base clustering at a later stage). In one or more embodiments, the base clustering comprises K-means algorithm. Table 2 shows a matrix resulting from base clustering of the N×K matrix $L_{k,n}^m$, according to table 1 (with M=1) for M=4 different well logs $L_1$, $L_2$, $L_3$, $L_4$ using K-means algorithm.

TABLE 2

Base clustering result matrix resulting from clustering
the matrices $L_{k,n}{}^m$ using K-means algorithm.

| n | $L_1$ Gamma Ray | $L_2$ Spontaneous Potential | $L_3$ ML1 | $L_4$ ML2 |
|---|---|---|---|---|
| 1 | 3 | 4 | 1 | 3 |
| 2 | 1 | 3 | 3 | 3 |
| 3 | 3 | 4 | 4 | 4 |
| 4 | 3 | 4 | 1 | 1 |
| 5 | 1 | 1 | 3 | 3 |
| 6 | 4 | 4 | 3 | 3 |
| 7 | 3 | 1 | 1 | 1 |
| 8 | 4 | 3 | 1 | 1 |
| 9 | 2 | 2 | 2 | 2 |
| 10 | 2 | 2 | 2 | 2 |
| 11 | 2 | 2 | 2 | 2 |
| 12 | 2 | 2 | 2 | 2 |
| 13 | 2 | 2 | 2 | 2 |
| 14 | 2 | 2 | 2 | 2 |
| 15 | 2 | 2 | 2 | 2 |

In step 212, the clustering result matrix is aggregated to a cluster ensemble $\pi_1, \pi_2, \ldots, \pi_M$. The cluster ensemble combines multiple clustering result matrices of the well logs to yield a single overall clustering. The cluster ensemble $\pi_1, \pi_2, \ldots, \pi_M$ clusters the well logs by considering multiple well logs together.

In step 214, the cluster ensemble $\pi_1, \pi_2, \ldots, \pi_M$ is spatial partitioned resulting in a map that shows the geological heterogeneity trends associated with cluster types of the wells. The domain of the well log data, acquired from the cluster ensemble, is extended to a 2D spatial domain. The 2D spatial domain reveals an insight in how similar the wells $w_1, w_2, \ldots, w_N$ are clustered. The spatial partitioning comprises a 3D spatial compartmentalization of the underlying domains according to the types of the well logs. Finally, target areas are obtained for integrated reservoir studies by clustering the wells.

Figure 3:
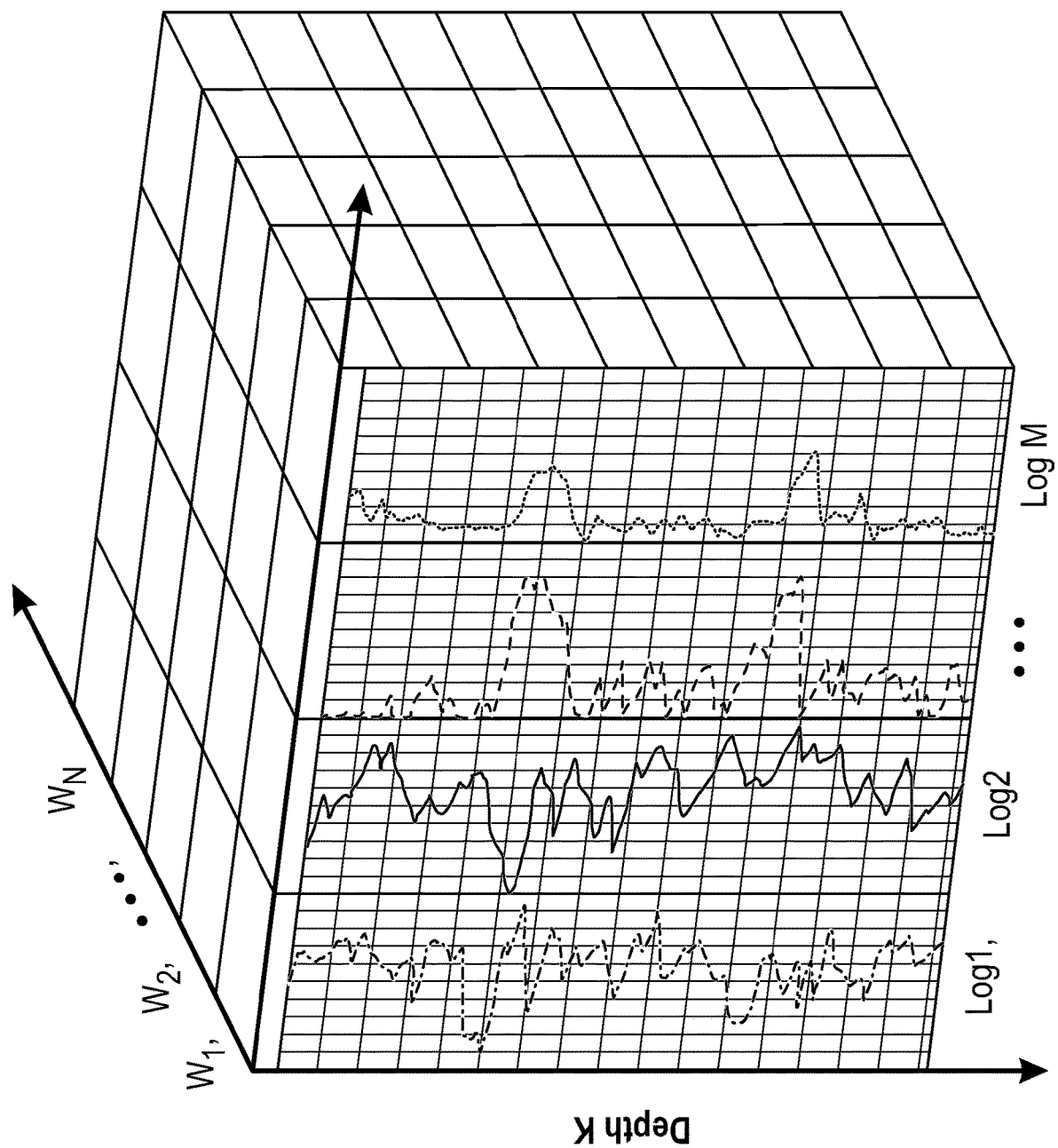
FIG. 3 shows a cube comprising the log curves (log 1 or L1, log 2 or L2, etc.) for wells as function of the depth (D1, D2, etc.) of the respective well in accordance with one or more embodiments.

FIG. 3 shows a cube comprising the log curves log 1, log 2, ..., log M for N wells $w_1, w_2, \ldots, w_N$ as function of the depth K of the respective well. There are N wells, each well has M types of well logs, and each well comprises K measurement points along the depth of the well.

FIG. 4 shows a third degree tensor $T_{k,m,n}$ with the dimension K×M×N. The tensor $T_{k,m,n}$ has three indices k, m, n where k is an index for the depth with $D_1, D_2, \ldots, D_K$, m is an index for the well log $L_1, L_2, \ldots, L_M$, and n is an index for the wells $w_1, w_2, \ldots, w_N$. In one or more embodiments, the third degree tensor $T_{k,m,n}$ is a massive tensor.

Figure 5A:
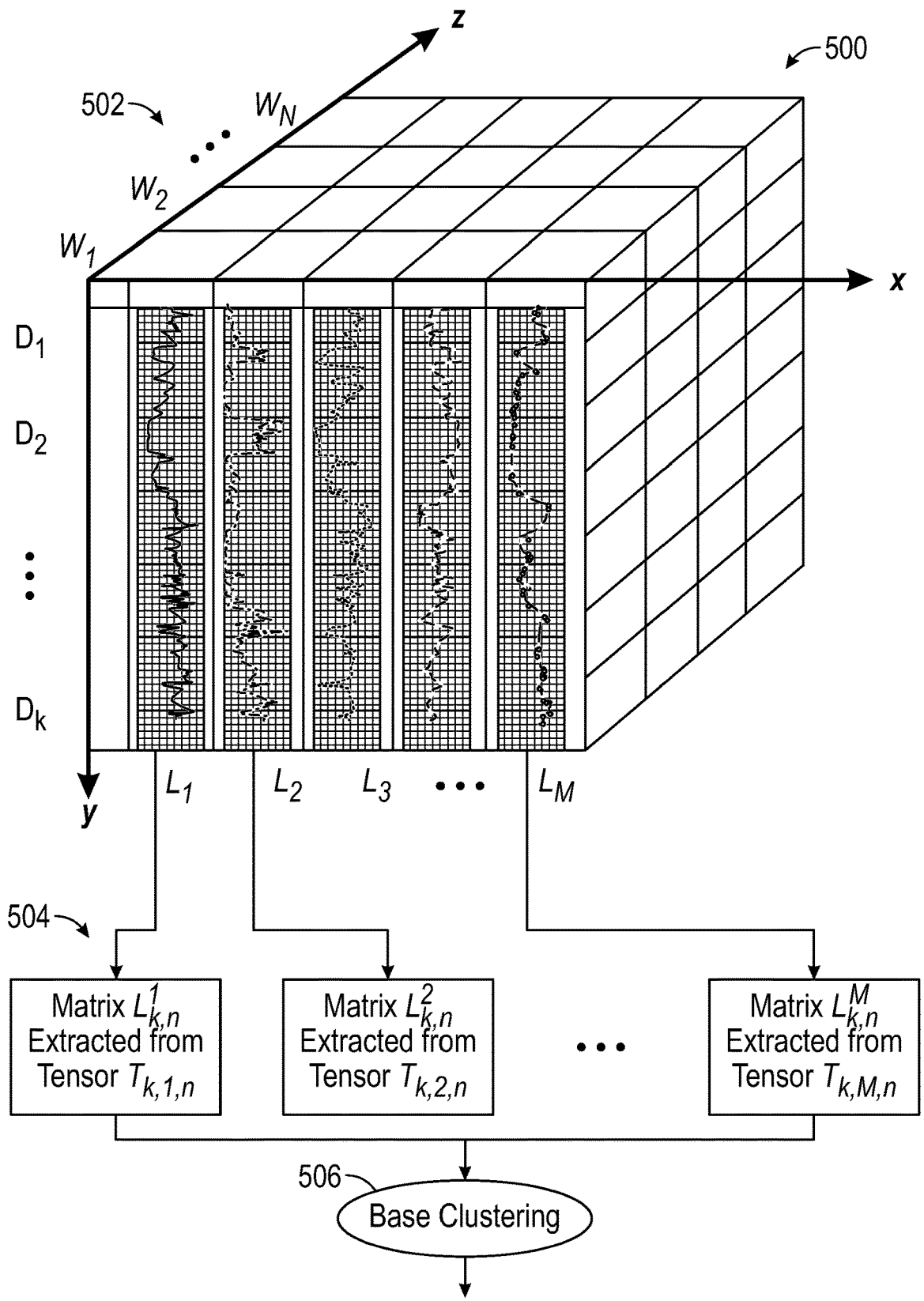
FIGS. 5A-5B show flowcharts for obtaining geological heterogeneity trends of a geological formation in accordance with one or more embodiments (K is the total number of depths, M is the number of logs, and N is the number of wells).

FIG. 5A shows a flowchart 500 of the method steps for obtaining geological heterogeneity trends of a geological formation.

In step 502, the tensor $T_{k,m,n}$ is obtained (see description of FIG. 4 above).

In step 504, matrices $L_{k,n}{}^1, L_{k,n}{}^2, \ldots, L_{k,n}{}^M$ are extracted from the Tensor $T_{k,m,n}$. The matrices $L_{k,n}{}^1, L_{k,n}{}^2, \ldots, L_{k,n}{}^M$ represent the heterogeneous physical properties of the formation.

In step 506, the matrices $L_{k,n}{}^1, L_{k,n}{}^2, \ldots, L_{k,n}{}^M$ are base clustered to a base clustering result. The base clustering results are shown in FIG. 5B and described below.

Figure 5B:
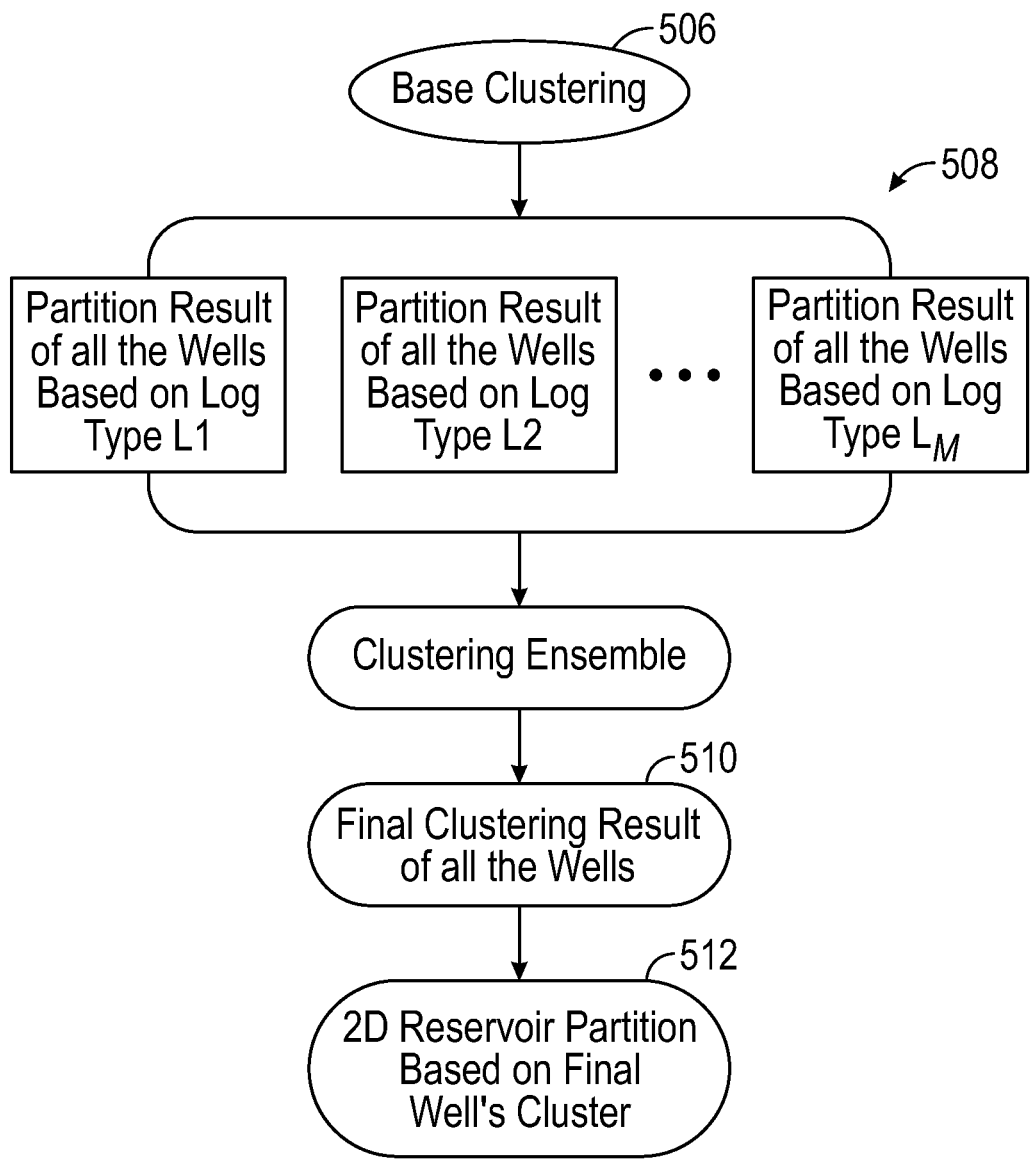

FIG. 5B shows a continuation the method steps of FIG. 5A.

In step 508, the base clustering results are obtained from the base clustering.

In step 510, the cluster ensemble $\pi_1, \pi_2, \ldots, \pi_M$ is combined to a single overall cluster.

In step 512, a 2D spatial map from the overall cluster is obtained. The 2D spatial map shows the geological heterogeneity trends associated with cluster types of all the wells $w_1, w_2, \ldots, w_N$. The 2D spatial map reveals the heterogeneity not only within the same well, but also in the spatial domain between the wells. Thereby, it provides a pseudo-2D heterogeneity reservoir model for enhanced geological and engineering studies. Each measured type of well log reveals its heterogeneity.

Figure 6:
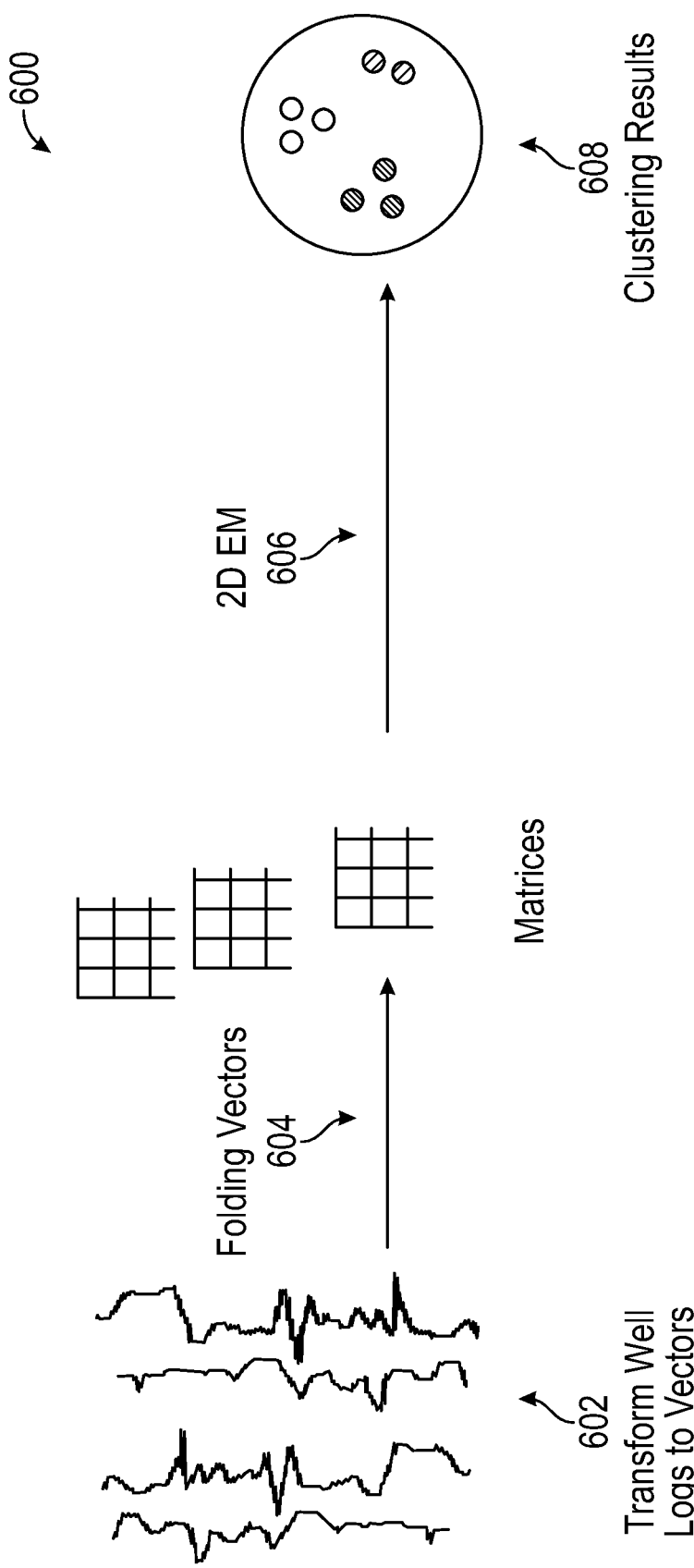
FIG. 6 shows a flowchart of the procedure for clustering the matrices in accordance with one or more embodiments.

FIG. 6 shows a flowchart 600 of the steps of the procedure for clustering the matrices $L_{k,n}{}^1, L_{k,n}{}^2, \ldots, L_{k,n}{}^M$ based on the characteristics of the corresponding well logs $L_1, L_2, \ldots, L_M$ to a clustering result matrix.

In step 602, the well logs $L_1, L_2, \ldots, L_M$ are transformed to vectors $D_{m,n}$.

In step 604, the vectors $D_{m,n}$ are folded to folding matrices. The description of FIGS. 7 and 8 describe the procedure for folding a vector $D_{m,n}$ to a folding-matrix.

In step 606, the matrices are 2D EM (2D expectation maximization) clustered.

One of the base clustering techniques is 2D EM clustering. The 2D EM clustering characterizes the features of the well logs. The 2D EM clustering is especially suited for small well numbers N and the high numbers of depth K>>N.

In one or more embodiments, the 2D EM clustering comprises spectral clustering because the number N of the wells is much smaller than the number of types (including the total number of logs, excluding the total number of log types) of well logs M. Spectral clustering uses the spectrum (eigenvalues) of a similarity matrix to perform dimensionality reduction before clustering in fewer dimensions. The 2D EM clustering is performed for all the wells N based on the characteristics of each type of well log $L_1, L_2, \ldots, L_M$.

The 2D EM clustering is unsupervised and determines factors of the probability distribution by a maximum likelihood estimation. Specifically, random values are selected by the maximum likelihood estimation to estimate the best fit for the petrophysical well logs and wells. The maximum likelihood estimation is then obtained using the 2D EM clustering.

Assuming a vector $Y=\{y_1, y_2, \ldots, y_k\}$ represents unlabeled wells with a number k of the unlabeled wells. Let the class label of the n-th cluster be denoted as $Y_n$ for (n=1, ..., C) being $\alpha_n$.

The probability of the mixture component is:

$$P(n|Y_k) = \frac{\pi_n P(Y_k | \alpha_n, \beta_n)}{\sum_{n=1\ldots c} \pi_n P(Y_k | \alpha_n, \beta_n)} \quad (1)$$

where $\alpha_n$, $\beta_n$ are the estimates of mean and standard deviation respectively of m component. The denominator in Eq. (1) normalizes the probability of the mixture component $P(n|Y_k)$ based on:

$$0 \leq P(n|Y_k) \leq 1 \quad (2)$$

$$\sum_{n=1}^{c} P(n|Y_k) \leq 1 \quad (3)$$

In the maximization step, the probabilities are used to perform re-estimation of the parameter. The likelihood clusters are evaluated using Eq. (4) to (6).

$$\alpha_n = \frac{\sum_{k=1}^{N} P(n|Y_k)Y_k}{\sum_{k=1}^{N} P(n|Y_k)} \quad (4)$$

$$\beta_n^2 = \frac{\sum_{k=1}^{N} P(n|Y_k)\|Y_k - \mu_k\|^2}{\sum_{k=1}^{N} P(n|Y_k)} \quad (5)$$

$$\pi_n = \frac{1}{N}\sum_{k=1}^{N} P(n|Y_k)Y_k \quad (6)$$

After a vector is folded into a matrix, the above introduced maximum likelihood estimation of EM algorithm is implemented for matrix clustering. The core of the method for obtaining geological heterogeneity trends of a geological formation penetrated by the wells $Y=\{y_1, y_2, \ldots, y_k\}$ is to cluster a set of 2D matrices through using this 2D EM clustering.

During clustering, the distance between each matrix pairs $y_i$ and $y_j$ is calculated using a Hausdorff distance. The Hausdorff distance measures how large a metric space is from each other.

More formally, the Hausdorff distance from set A to set B is a maximum function, defined as:

$$h(A, B) = \max_{a \in A}\left\{\min_{b \in B}\{d(a, b)\}\right\} \quad (7)$$

where a and b are values from matrix A and B respectively, and d(a,b) is any distance calculated between a and b. For simplicity, Euclidian distance between a and b is used in the calculation.

The 2D EM clustering is performed for all types of well logs m that are different from each other. Therefore, the matrices used for 2D EM clustering are N×K matrices for each type of well log clustering. In other words, each well $w_1, w_2, \ldots, w_N$ has K measuring points along the depth of the well $w_n$.

The results from the 2D EM clustering characterize the vertical shape information of the well logs $L_1, L_2, \ldots, L_M$.

Entering different data of well logs in the 2D EM clustering results in a matrix of different wells with different types of well logs.

In step 608, the 2D EM clustering outputs the clustering results. The space of the clustering results is a latent space which has no spatial meaning and no relationship with the well locations. The clustering results are just for easy understanding. Actually, there is no need to do such a 2D projection from a hyper-dimensional latent space.

Using different well log data as the input for clustering of the matrices $L_{k,n}^1, L_{k,n}^2, \ldots, L_{k,n}^M$, the result is a table of different wells with different types of well logs.

Figure 7:
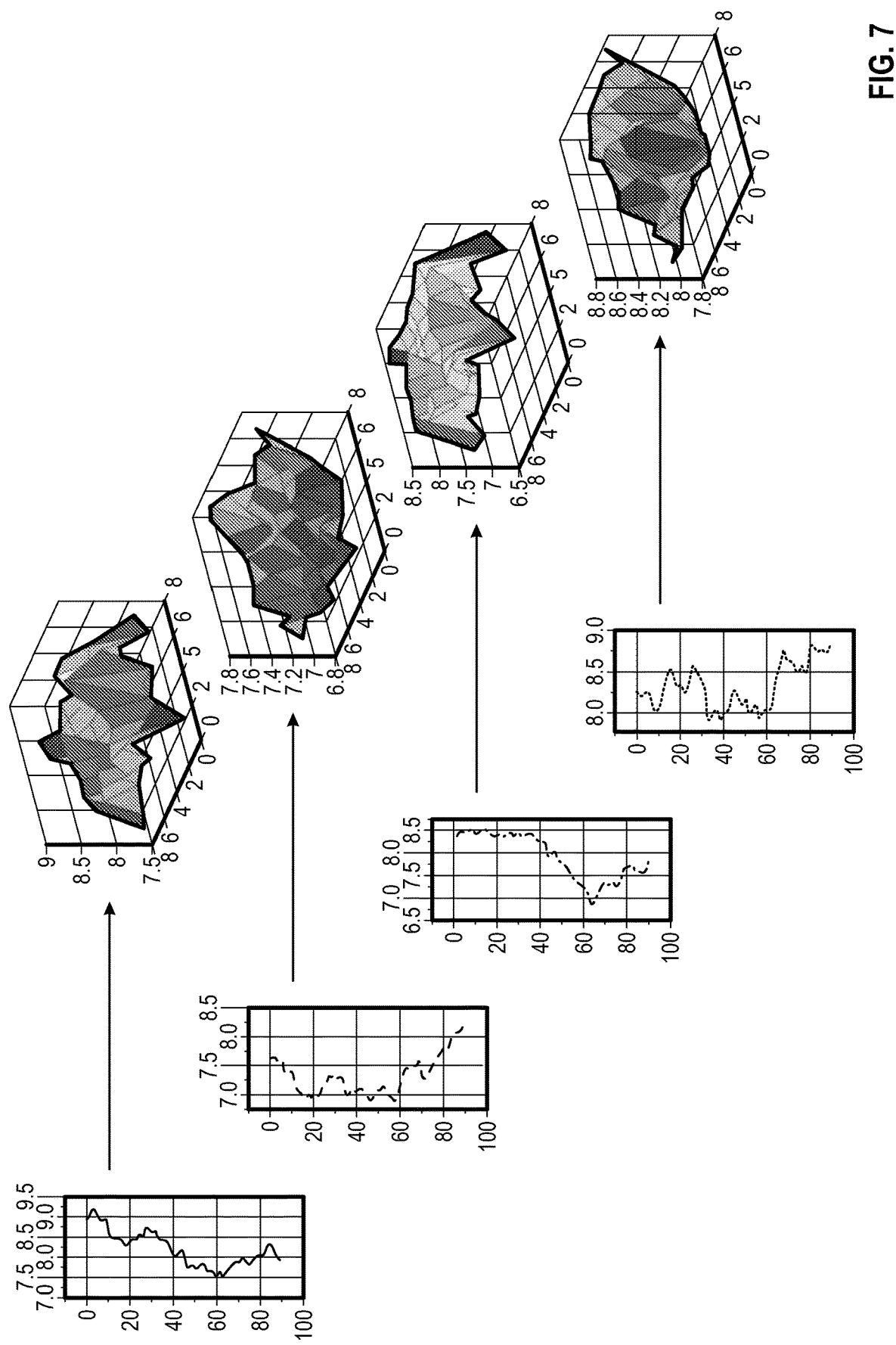
FIG. 7 shows the procedure for folding a vector into a fold-matrix in accordance with one or more embodiments.

FIG. 7 shows the procedure for folding a vector $D_{m,n}$ into a fold-matrix. Each column of the tensor $T_{k,m,n}$ is a vector $D_{m,n}=\{D_1, D_2, \ldots, D_K\}$. The vector $D_{m,n}$ describes k observed real values along the well. In a first step of the procedure for folding a vector, the vector $D_{m,n}$ is rescaled, such that all values $D_k$ of the vector $D_{m,n}$ fall within the interval [−1, 1]. The values $D_k$ of the vector $D_{m,n}$ are rescaled by:

$$\tilde{D}_k = \frac{(D_k - \max(D_{m,n})) + (D_k - \min(D_{m,n}))}{\max(D_{m,n}) - \min(D_{m,n})} \quad (8)$$

In the second step of the procedure for folding a vector, the vector $\tilde{D}_k$ is transformed from Cartesian coordinate system to polar coordinate system. The rescaled vector $\tilde{D}_x$ follows polar coordinates by encoding the values $D_k$ as the angular cosine and depth step as the radius with the equation below:

$$\begin{cases} \phi = \arccos(\tilde{x}_i), -1 \leq \tilde{x}_i \leq 1, \tilde{x}_i \in \tilde{X} \\ r = \frac{t_i}{N}, t_i \in \mathbb{N} \end{cases} \quad (9)$$

where $t_i$ are the depth steps, and $\mathbb{N}$ is a constant factor to regularize the span of the polar coordinate system.

The transformation from Cartesian coordinate to polar coordinate through Eq. (9) has two important properties. The first property is that Eq. (9) is bi-ejective, because cos (φ) is monotonic when $\phi \in [0, \pi]$. The character encoding map produces only one result in the polar coordinate system with a unique inverse function. The second property is that as opposed to Cartesian coordinates, polar coordinates preserve absolute temporal relations of the vector. Thus, the corresponding area from depth step $t_i$ to depth step $t_j$ is not only dependent on the depth interval $|t_i - t_j|$, but also determined by the absolute value of $t_i$ and $t_j$.

After transforming the rescaled vector into the polar coordinate system, the angular cosine is easily exploited by considering the trigonometric sum between each point to identify the temporal correlation of the well log values within different measured depth intervals.

In case the radius r is known, the fold-matrix is defined as follows:

$$G = \begin{bmatrix} \cos(\phi(x_1) + \phi(x_1)) & \ldots & \cos(\phi(x_1) + \phi(x_n)) \\ \cos(\phi(x_2) + \phi(x_1)) & \ldots & \cos(\phi(x_2) + \phi(x_n)) \\ \vdots & \ddots & \vdots \\ \cos(\phi(x_n) + \phi(x_1)) & \ldots & \cos(\phi(x_n) + \phi(x_n)) \end{bmatrix} \quad (10)$$

The fold-matrix in Eq. (10) has several advantages. First advantage is that the matrix G provides a way to preserve the temporal dependency. The third-degree matrix G contains temporal correlations because G (i,j||i−j|=k) represents the relative correlation by superposition of directions with respect to depth interval k. The main diagonal $G_{i,i}$ of the matrix G is the special case when k=0, which contains the original value/angular information.

Figure 8:
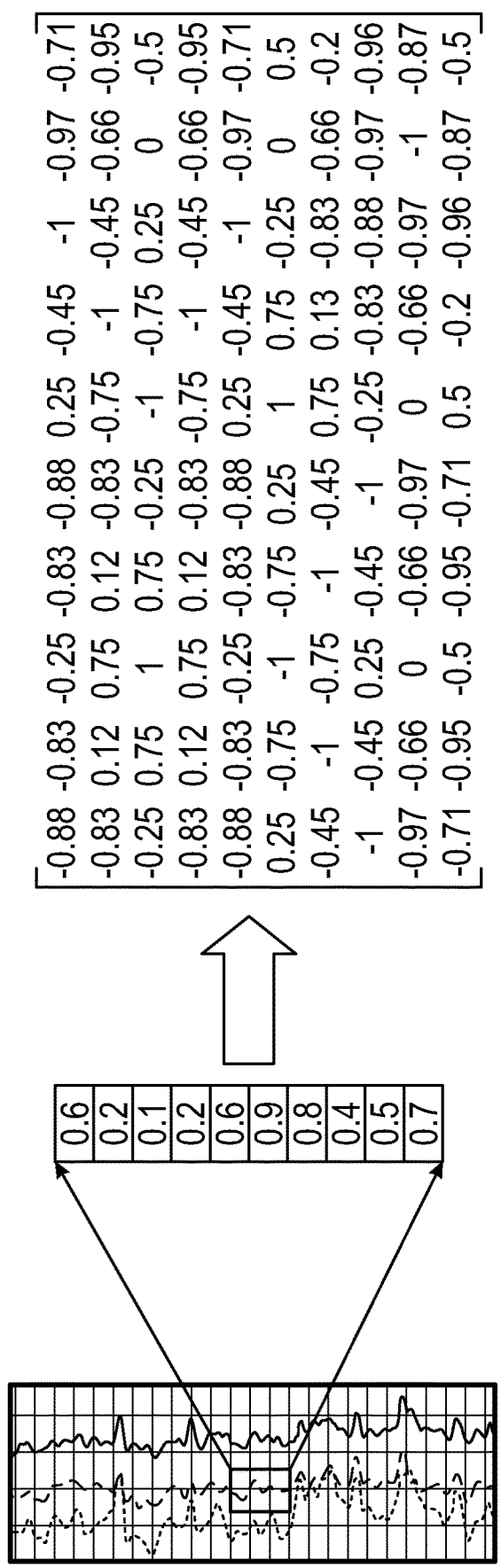
FIG. 8 shows an example of a matrix generated by folding a vector in accordance with one or more embodiments.

For example, assuming the vector $D_{m,n}$ describes k=10 observed real values along the well. In a first step the vector is normalized to an interval [−1,1] (see Eq. (8)). In a second step the angular coordinates are calculated (see Eq. (9)). In a third step, the matrix G is calculated by Eq. (10). The vector is transformed into a data 10×10 matrix. In a fourth step a 2D image is determined. FIG. 8 shows an example of a matrix generated from a vector.

Figure 9:
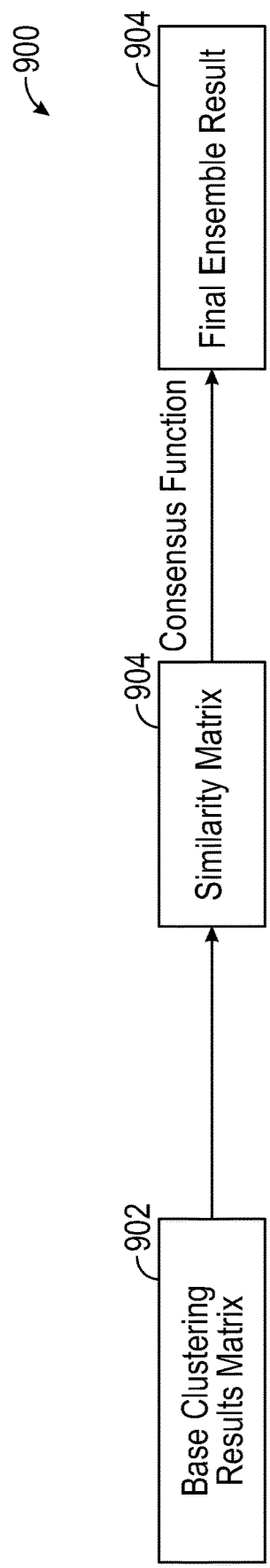
FIG. 9 shows a flowchart for generating a cluster ensemble in accordance with one or more embodiments.

FIG. 9 illustrates the procedure of the cluster ensemble. The cluster ensemble comprises generating a cluster ensemble, creating link-based similarity matrices, consensus functions and evaluating clustering results, respectively. The Link-based technique is to ensemble the based clustering result into a final cluster result. The similarity matrices are between different base clustering results. For example, if the base clustering from $L_1$ is the same as $L_2$, then, the similarity distance between them is 0.

Figure 10:
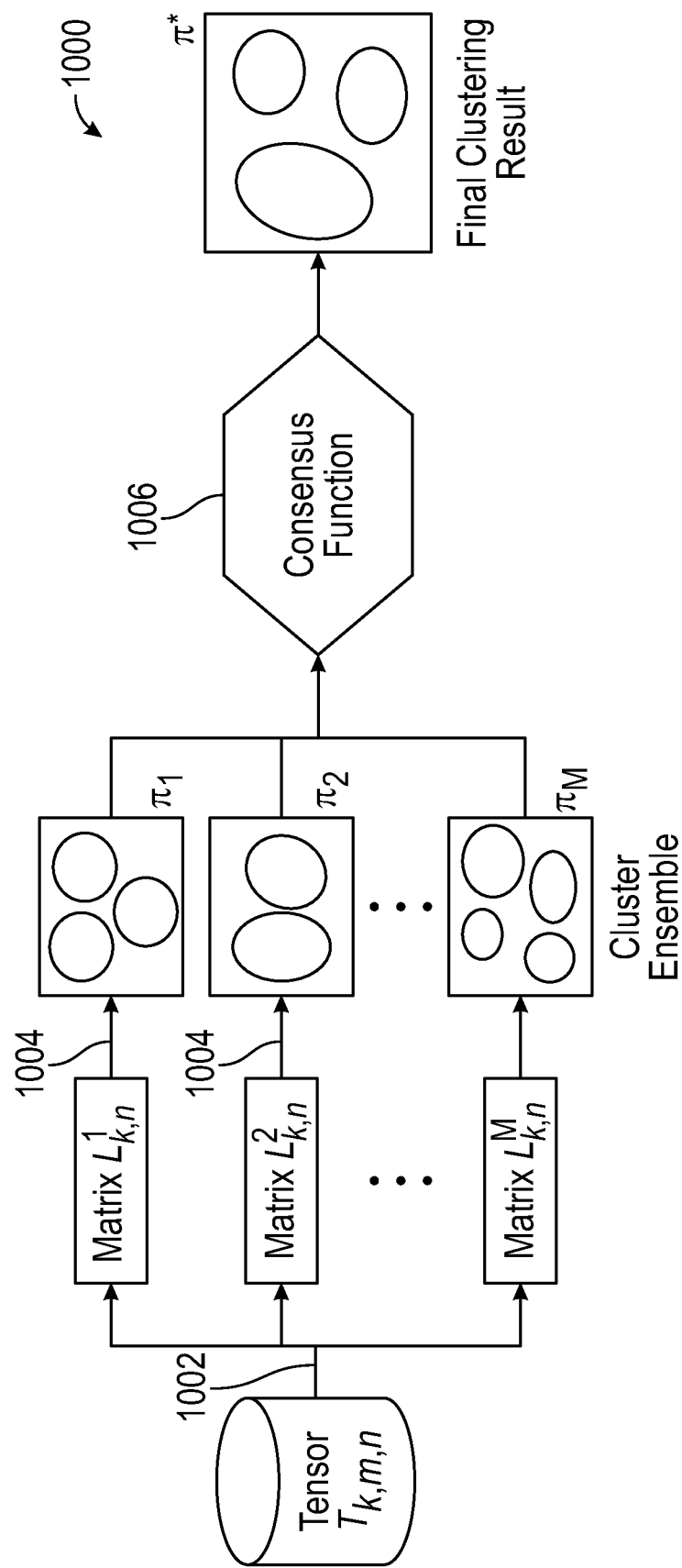
FIG. 10 shows a procedure for obtaining a cluster ensemble in accordance with one or more embodiments.

Generating a cluster ensemble is described in the description of FIG. 10. Creating similarity matrices is defined as follows: Two matrices A and B are called similar if there exists an invertible n-by-n matrix P such that $B=P^{-1}AP$. Creating the consensus functions is also described in the description of FIG. 10.

FIG. 10 shows a procedure for obtaining a cluster ensemble. The 2D EM cluster ensemble $\pi_1, \pi_2, \ldots, \pi_M$ are obtained by combining the matrices resulted from the 2D EM clustering via a special cluster algorithm that generates the well log based cluster ensemble.

In step 1002, the matrices $L_{k,n}^1, L_{k,n}^2, \ldots, L_{k,n}^M$ are extracted from the tensor $T_{k,m,n}$.

In step 1004, the matrices $L_{k,n}^1, L_{k,n}^2, \ldots, L_{k,n}^M$ are aggregated into a cluster ensemble $\pi_1, \pi_2, \ldots, \pi_M$.

An algorithm of the cluster ensemble combines different datasets with various clustering algorithms to achieve better accuracy than the individual clustering algorithms. The matrices $L_{k,n}^m = \{L_{k,n}^1, L_{k,n}^2, \ldots, L_{k,n}^M\}$ are a set of M data points $L_{k,n}^m$ and $\Pi = \{\pi_1, \pi_2, \ldots, \pi_M\}$ is the cluster ensemble with M ensemble members $\pi_m$. Each ensemble member πm of the cluster ensemble $\Pi = \{\pi_1, \pi_2, \ldots, \pi_M\}$ returns a set of cluster ensembles $\pi_i = \{C_1^i, C_2^i, \ldots, C_{k_i}^i\}$, such that $U_{j=1}^{k_i} C_j^i = L_{k,n}^m$, where $k_i$ is the number of clusters in the i-th clustering. Each $L_{k,n}^m \in T_{k,m,n}$, $C(L_{k,n}^m)$ denotes the cluster label to which the data point $D_k$ belongs. In the i-th clustering, $C(L_{k,n}^m) = j$ if $x \in C_j^i$, the problem is to find a new partition $\pi^*$ of a data set $L_{k,n}^m$ that summarizes the information from the cluster ensemble. In other words, the special cluster ensemble combines the clustering with the same dataset with various clustering algorithms.

In step 1006, the cluster ensemble $\pi_1, \pi_2, \ldots, \pi_M$ is entered into a consensus function that performs spatial partitioning of the cluster ensemble $\pi_1, \pi_2, \ldots, \pi_M$ resulting in a map that shows the geological heterogeneity trends associated with cluster types of the wells.

The ensemble members $\pi_1, \pi_2, \ldots, \pi_m$ are inputted in the consensus function. The ensemble members $\pi_1, \pi_2, \ldots, \pi_m$ are aggregated to form a final data partition. There are two main stages: (i) generating the similarity matrix through cluster ensemble, and (ii) producing the final partition by a consensus function.

Consensus clustering is a method of ensemble clustering the clustering results from multiple clustering algorithms. Also called aggregation of partitions, the consensus clustering refers to the situation in which a number of different clusterings are obtained for a particular dataset and it is desired to find a single (consensus) clustering which is a better fit in some sense than the existing clusterings. Consensus clustering is the problem of reconciling clustering information about the same data set coming from different sources or from different runs of the same algorithm. When cast as an optimization problem, consensus clustering is known as median partition. Consensus clustering for unsupervised learning is analogous to ensemble learning in supervised learning.

There are many clustering techniques, either supervised or unsupervised learning, which are widely used in the case of unlabeled data, i.e., data without defined categories or groups.

After the Ensemble operation, the Base clustering result matrix in table 2 is spatial partitioned into one final clustering, as shown in table 3.

TABLE 3

Cluster ensemble from multiple well logs.

| n | $L_1$ Gamma Ray | $L_2$ Spontaneous Potential | $L_3$ ML1 | $L_4$ ML2 | Cluster Ensemble |
|---|---|---|---|---|---|
| 1 | 3 | 4 | 1 | 3 | 3 |
| 2 | 1 | 3 | 3 | 3 | 3 |
| 3 | 3 | 4 | 4 | 4 | 3 |
| 4 | 3 | 4 | 1 | 1 | 1 |
| 5 | 1 | 1 | 3 | 3 | 3 |
| 6 | 4 | 4 | 3 | 3 | 3 |
| 7 | 3 | 1 | 1 | 1 | 1 |
| 8 | 4 | 3 | 1 | 1 | 1 |
| 9 | 2 | 2 | 2 | 2 | 2 |
| 10 | 2 | 2 | 2 | 2 | 2 |
| 11 | 2 | 2 | 2 | 2 | 2 |
| 12 | 2 | 2 | 2 | 2 | 2 |
| 13 | 2 | 2 | 2 | 2 | 2 |
| 14 | 2 | 2 | 2 | 2 | 2 |
| 15 | 2 | 2 | 2 | 2 | 2 |

Figure 11:
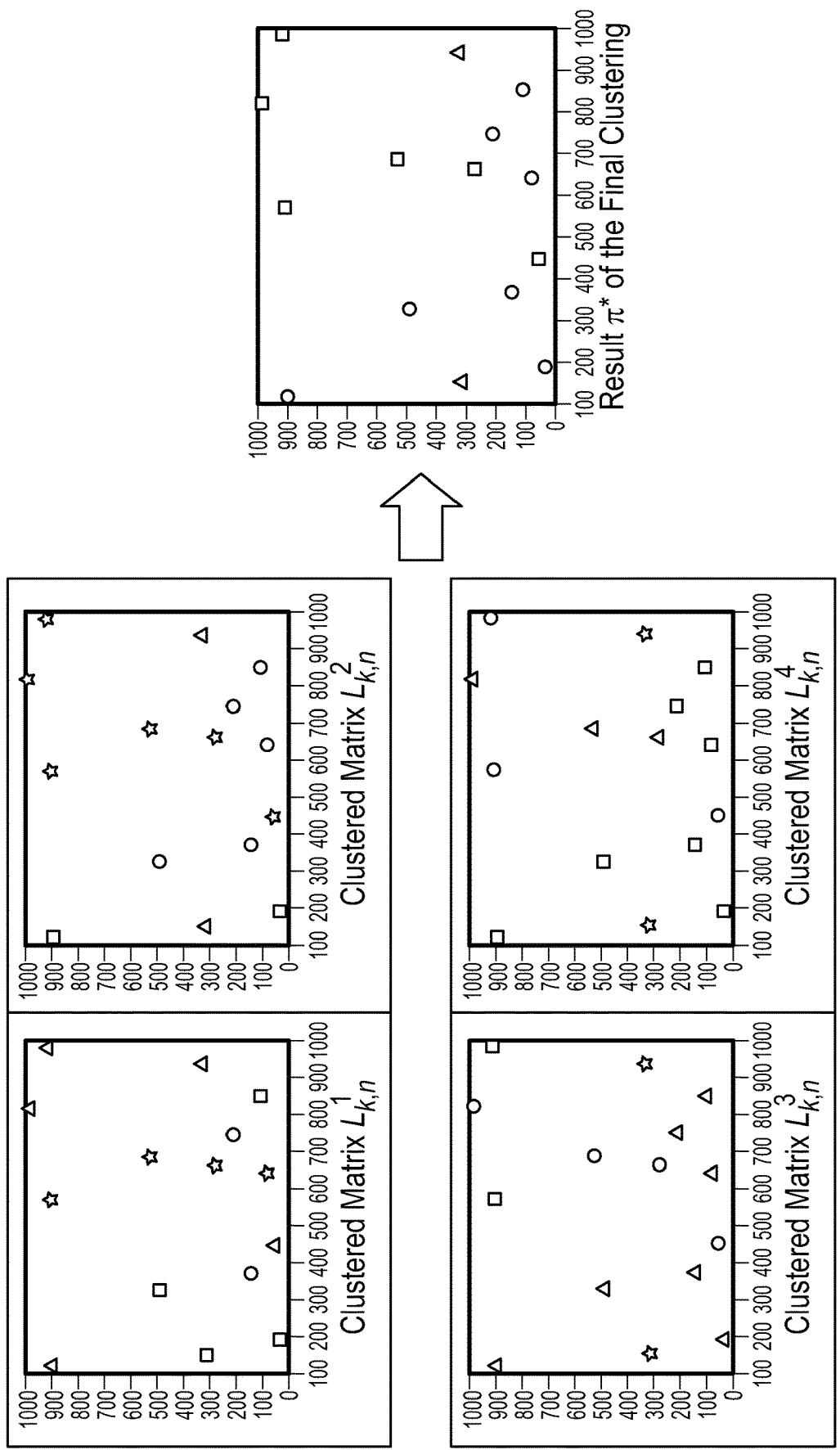
FIG. 11 shows the result of the cluster ensemble in accordance with one or more embodiments.

FIG. 11 shows the result of the cluster ensemble using the data in table 3. On the left side of FIG. 11, four clustered matrices $L_{k,n}^1, L_{k,n}^2, L_{k,n}^3, L_{k,n}^4$ are depicted. The four clustered matrices $L_{k,n}^1, L_{k,n}^2, L_{k,n}^3, L_{k,n}^4$ are aggregated to a final clustering result $\pi^*$.

The base clustering of well logs only accounts for the well log data and is, therefore, one dimensional. However, the spatial partitioning of the well logs is two-dimensional. In one or more embodiments, the spatial partitioning is based on a simple inverse distance algorithm or an advanced spatial interpolation method, such as indicator kriging using an indicator function, is implemented.

Multivariate interpolation is interpolation on functions when the variates are spatial coordinates (spatial interpolation). Multivariate interpolation creates a digital elevation model from a set of points on the Earth's surface.

The indicator function of a subset A of a set X is a function defined from X to the two-element set $\{0,1\}$, denoted as $1_A: X \to \{0,1\}$. The indicator function indicates whether an element in X belongs to A or not. The indicator function of a subset A of a set X is a function $1_A: X \to \{0,1\}$, defined as $$1_A : X := \begin{cases} 1 & \text{if } x \in A \\ 0 & \text{if } x \notin A \end{cases}.$$

The clustering results in ensemble result column of table 3 using the 15 wells, are used as an example to illustrate the 2D spatial clustering algorithm. The first step is to prepare data files for 15 wells, comprising well logs, spatial x and y coordinates, and lowest depth $D_1$ and highest depth $D_K$ of the respective well. Table 4 lists well number, spatial x and y coordinates of the well, lowest depth $D_1$, and highest depth $D_K$ of the respective well.

TABLE 4

Spatial coordinates and top and bottom depth data of N = 15 wells.

| well nr. n | x | y | $D_1$ | $D_K$ |
|---|---|---|---|---|
| 1 | 663.70 | 278.40 | 1480 | 1487 |
| 2 | 940.68 | 326.68 | 1488 | 1496 |
| 3 | 571.23 | 906.21 | 1417 | 1523 |
| 4 | 819.02 | 986.84 | 1454 | 1461 |
| 5 | 983.75 | 916.28 | 1490.25 | 1586 |
| 6 | 449.47 | 54.76 | 1492 | 1497.25 |
| 7 | 686.65 | 526.78 | 1443 | 1459.75 |
| 8 | 151.67 | 314.85 | 1594 | 1670.5 |

TABLE 4-continued

Spatial coordinates and top and bottom depth data of N = 15 wells.

| well nr. n | x | y | $D_1$ | $D_K$ |
|---|---|---|---|---|
| 9 | 641.00 | 79.61 | 1567.25 | 1580.25 |
| 10 | 747.99 | 210.07 | 1497.5 | 1514 |
| 11 | 119.85 | 899.28 | 1423.75 | 1535 |
| 12 | 327.74 | 489.98 | 1436.75 | 1553.25 |
| 13 | 372.05 | 143.87 | 1462 | 1579.75 |
| 14 | 852.69 | 110.41 | 1498 | 1516 |
| 15 | 190.62 | 32.63 | 1480.25 | 1601 |

Figure 12:
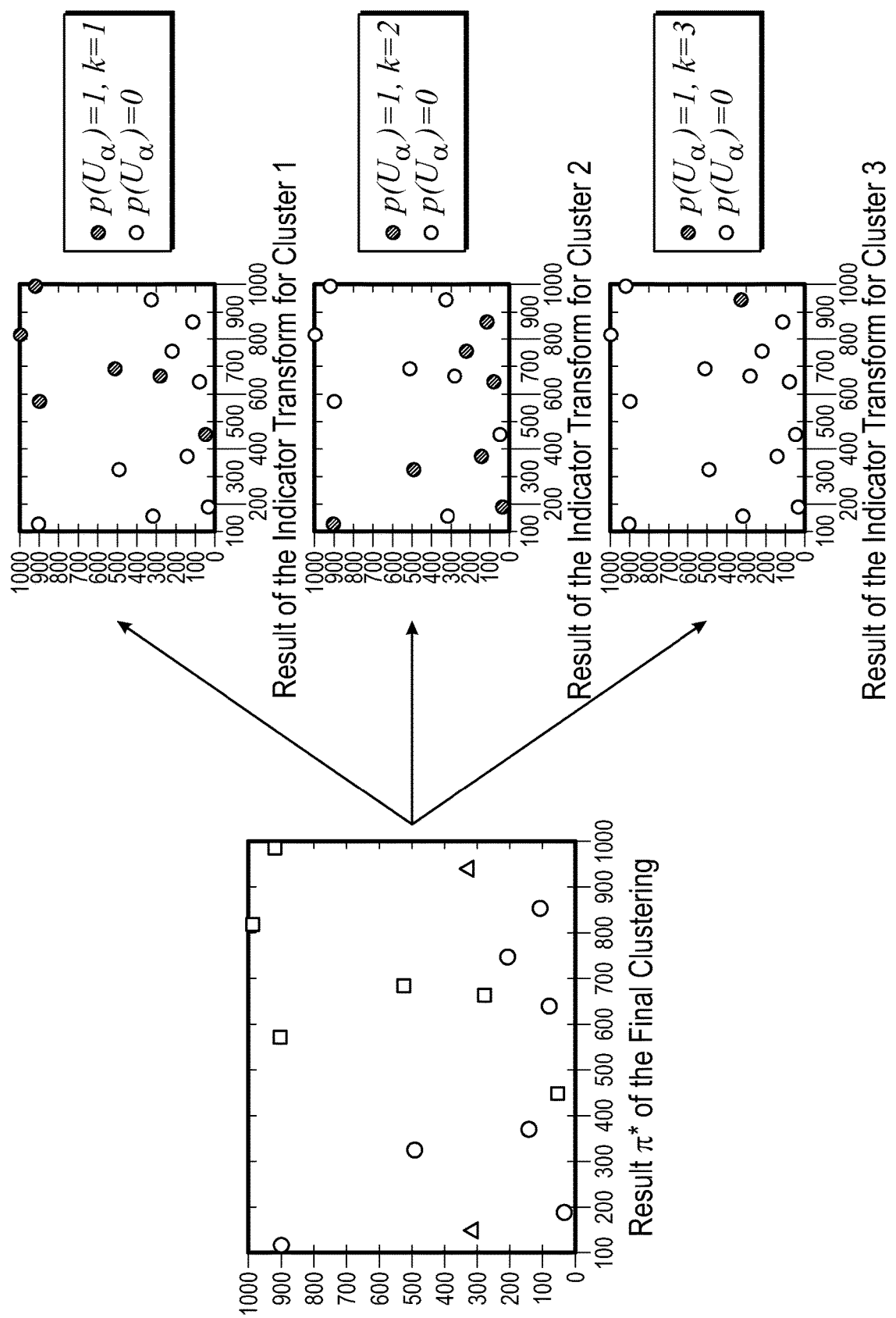
FIG. 12 shows a diagram of indicator transformation in accordance with one or more embodiments.

FIG. 12 shows a diagram of indicator transformation calculated by Eq. (11). The results are an indicator variable from each type of base clustering. For example, if there are four types of base clustering. The result will be four variables from each type four types of base clustering. On the left side of FIG. 12, the final clustering result π* of FIG. 11 is depicted. An indicator transformation is applied to the final clustering result π*.

The second step for spatial partitioning is to perform an indicator transformation to the clustering results for the wells in table 4. Assuming the locations are $u_\alpha$, $\alpha=1, \ldots, N$, the cluster results for those locations are denoted as $z(u_\alpha)=k$, $\alpha=1, \ldots, N$, $z=1, \ldots, K$. The indicator transformation is:

$$p_k(u_a) = \begin{cases} 1, & \text{if } z(u_a) = k; k =, \ldots, K \\ 0, & \text{otherwise} \end{cases} \quad (11)$$

From information theory, it is derivable that the indicator transformation results as the probability of each cluster at the well sites. If the indicator value is one, it means the probability to find the specific cluster at this site is 100 percent. Otherwise, the probability is zero.

Figure 13:
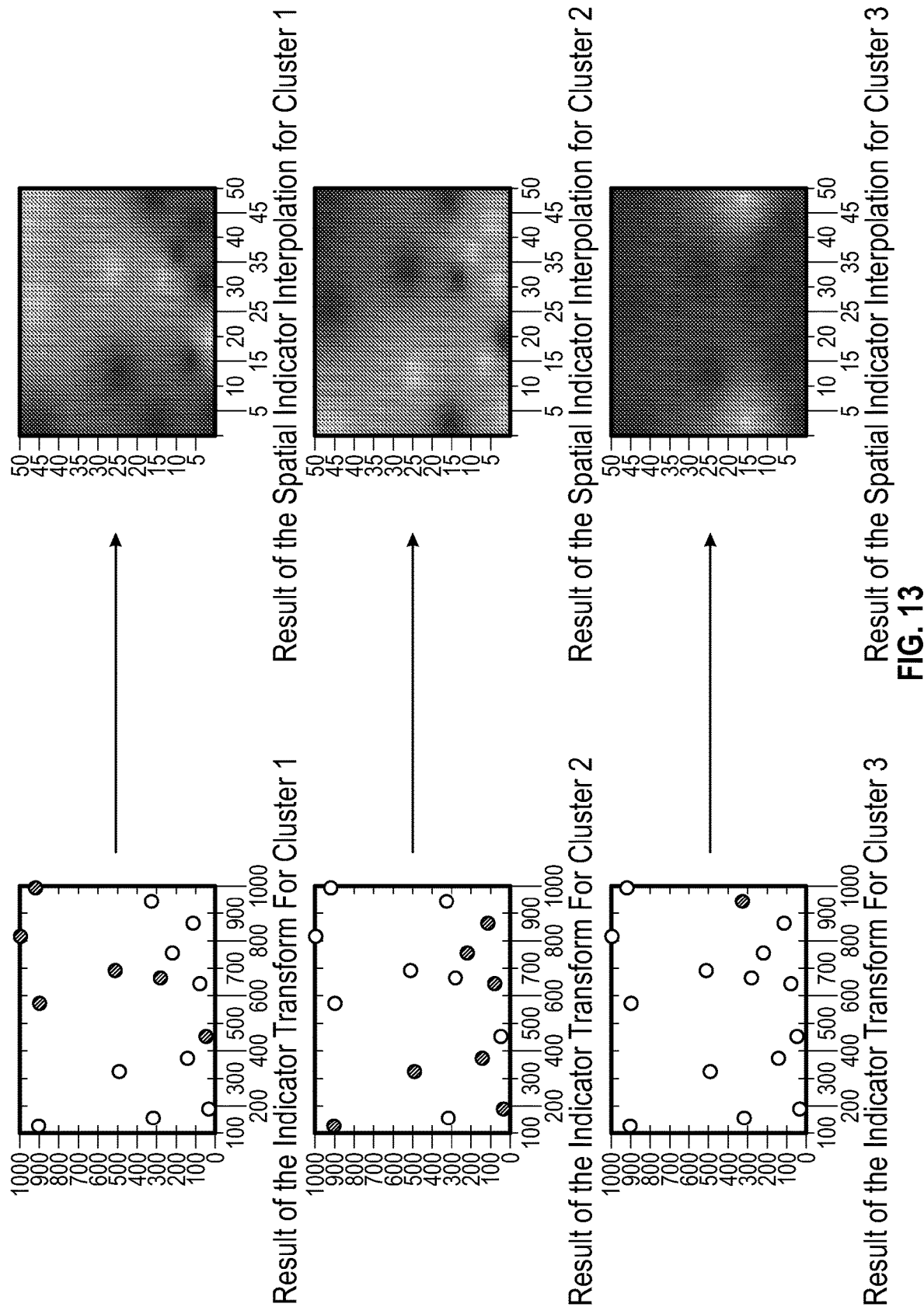
FIG. 13 shows a diagram of a cluster indicator interpolation in accordance with one or more embodiments.

The third step is to do an indicator interpolation. FIG. 13 shows a diagram of a cluster indicator interpolation calculated by Eq. (11). The cluster indicator interpolation transforms the indicators and comprises Inverse distance weighting (IDW). The IDW is a spatial interpolation to estimate an unknown value at a location using some known values with weighted distances between the locations of the known value and the location of the unknown value. An unknown value at a location to be determined is denoted as $p_k(u^*)$. $p_k(u_\alpha)$ is the probability of certain type for an offset well locations. The weight is inverse to the distance of an estimated location to each offset locations. Higher distances result in lower weight. So, for each cluster, the inverse distance weighted interpolation is calculated as:

$$p_k(u^*) = \sum_{\alpha=1}^{N} \frac{1}{d_\alpha} p_k(u_\alpha), \alpha = 1, \ldots, N; k = 1, \ldots, K \quad (12)$$

where $d_\alpha$ is the distance from current estimation spatial location to all the offset wells.

Figure 14:
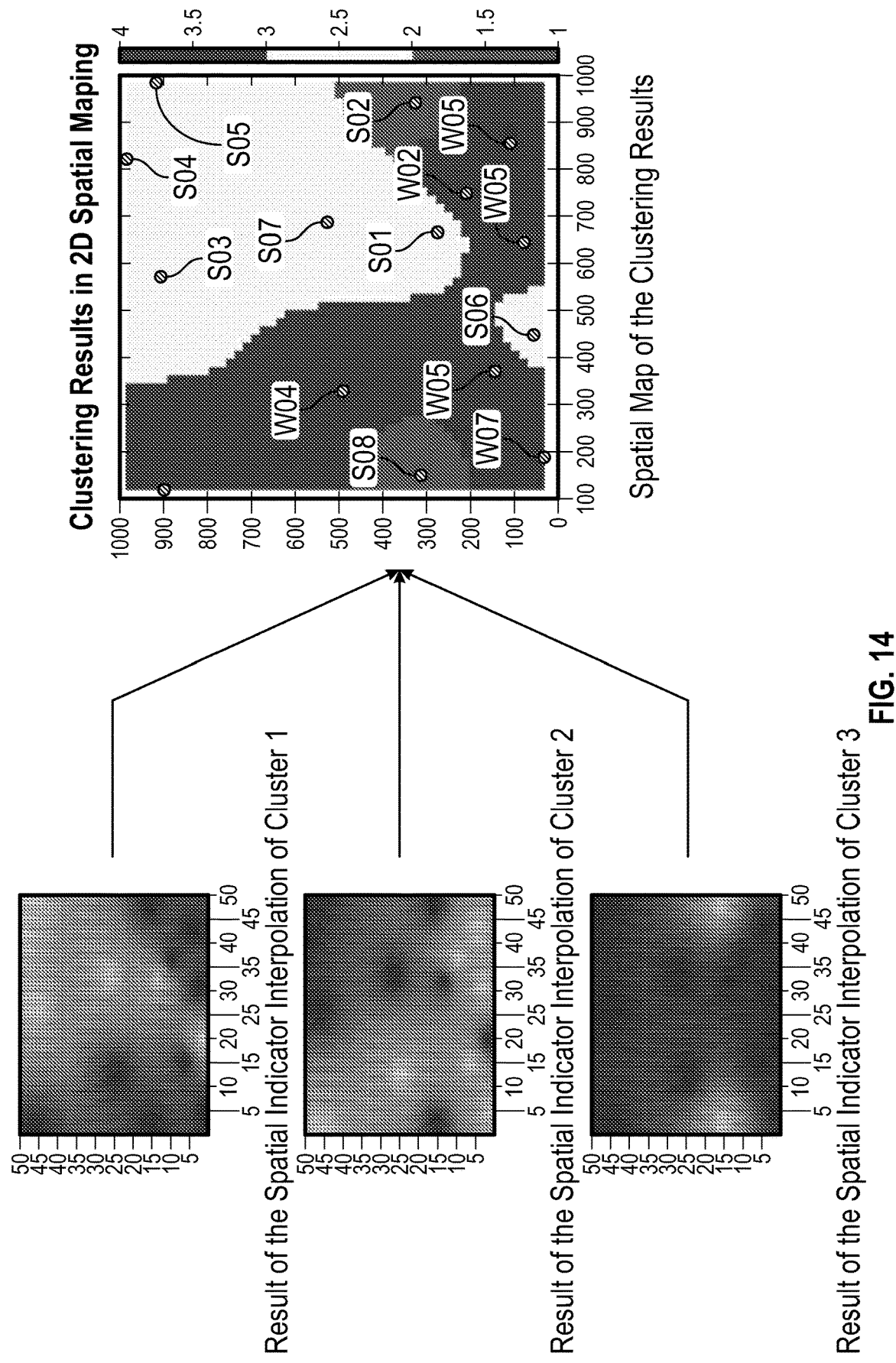
FIG. 14 shows a diagram of maximum probability threshold map in accordance with one or more embodiments.

FIG. 14 shows a diagram of a maximum probability threshold map. As the indicator transformation is interpreted as probability, the final map of this indicator variable interpolation will be a probability of each cluster type. But the importance lies on a type, so the maximum probability threshold is used to get a final cluster type based on Eq. (13).

After performing spatial indicator interpolation for all the clusters, a maximum probability threshold algorithm is implemented as given in the following equation:

$$z(u^*) = k; \max\{p_k(u^*)\}; k = 1, \ldots, K. \quad (13)$$

It assigns a specific cluster to each cell based on the probability of each cluster.

FIG. 15 illustrates the ML engine 1500 for performing the method for obtaining geological heterogeneity trends of a geological formation. In one or more embodiments, the ML engine 1500 is a high performance computing (HPC) device, server, desktop computer, laptop/notebook computer, wireless data port, smart phone, personal data assistant (PDA), tablet computing device, one or more computer processors within these devices, or any other suitable processing device, comprising both physical or virtual instances (or both) of the computing device. Additionally, the ML engine 1500 comprises a computer that comprises an input device, such as a keypad, keyboard, touch screen, or other device that can accept user information, and an output device that conveys information associated with the operation of the ML engine 1500, comprising digital data, visual, or audio information (or a combination of information), or a GUI.

The ML engine 1500 also comprises an interface 1504. The interface 1504 comprises software supporting one or more communication protocols. The interface 1504 further comprises hardware that receives the well log curves.

In one or more embodiments, the interface 1504 is wirelessly connected to ML engine 1500. In other embodiments, the interface 1504 comprises a wired connection to the ML engine 1500.

Furthermore, the ML engine 1500 comprises one or more ML algorithms 1508 for performing the method steps for determining properties of a formation. The ML algorithm 1508 is a software component of the ML engine 1500. Although illustrated as an internal part of the ML engine 1500, in alternative embodiments, the ML algorithm 1508 is an external component of the ML engine 1500.

The ML engine 1500 comprises a processor 1506. The processor 1506 executes instructions according to the ML algorithm 1508 and manipulates the well logs to perform the method for obtaining geological heterogeneity trends of a geological formation, according to the ML algorithm 1508.

The ML engine 1500 further comprises a database 1520. The existing well log curves are stored in the database 1520. While the database 1520 is illustrated as an integral component of the ML engine 1500, in alternative embodiments, the database 1520 is external to the ML engine 1500. The database 1520 may be any repository capable of storing data, including but not limited to data structures such as tables, lists, arrays, etc.

The interface 1504, the processor 1506, the ML algorithm 1508, and the database 1520 communicate via a system bus 1514. In one or more embodiments, any or all of the interface 1504, the processor 1506, the ML algorithm 1508, and the database 1520, communicate with each other over the system bus 1514 using an application programming interface (API) 1510 or a service layer 1512 or a combination of the API 1510 and service layer 1512.

In one or more embodiments, the ML algorithm 1508 creates a ML model with an artificial neural network (ANN). The ANN comprises neurons, wherein each neuron is connected to every other neuron in the ANN. A neuron receives data then processes it and sends the data to all the other neurons. The neurons are aggregated and organized into layers. The neurons of a layer are connected to all the neurons of the neighboring layers. A first layer is the input layer that receives the existing data logs. The last layer is the output layer that outputs the estimated pore pressure log. The mineral composition of the formation is predicted from the digital images of the drill cuttings using ANN.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for obtaining geological heterogeneity trends of a geological formation, comprising the steps:
    drilling wells that penetrate the formation,
    acquiring well logs for each well as function of depth intervals of the respective well,
    determining a third degree tensor, where a z-dimension denotes the depths, a x-dimension denotes the well logs, and a y-dimension denotes the wells,
    extracting matrices from the tensor,
    clustering the matrices based on the characteristics of the corresponding well logs to a clustering result matrix,
    aggregating the clustering result matrix to a cluster ensemble, and
    spatial partitioning the cluster ensemble to a map that shows the geological heterogeneity trends associated with cluster types of the wells.

2. The method according to claim 1, wherein the clustering of the matrices comprises:
    extracting vectors from the tensor,
    folding the vectors to matrices,
    clustering the matrices to a cluster ensemble by two dimension expectation maximization (2D EM) clustering to a final clustering result by a consensus function.

3. The method according to claim 2, wherein 2D EM clustering comprises determining a maximum likelihood estimate.

4. The method according to claim 2, wherein the 2D EM clustering comprises spectral clustering.

5. The method according to claim 1, wherein spatial partitioning of the cluster ensemble comprises generating a similarity matrix through cluster ensemble, and producing a final partition (consensus function).

6. The method according to claim 1, wherein a well log $L_m$ is acquired every 0.125 meter (0.5 feet).

7. The method according to claim 1, wherein well logs are acquired by wireline or logging while drilling (LWD).

8. The method according to claim 2, wherein folding the vector comprises the steps:
    rescaling the vector to a rescaled vector, such that all values fall within an interval $[-1, 1]$, by $$\tilde{D}_k = \frac{(D_k - \max(D_{m,n})) + (D_k - \min(D_{m,n}))}{\max(D_{m,n}) - \min(D_{m,n})},$$

where $D_{m,n}$ are the vectors, and $D_k$ are the values of the vectors,
transforming the rescaled vector from Cartesian coordinate system to polar coordinate system, by $$\begin{cases} \phi = \arccos(\tilde{x}_i), -1 \leq \tilde{x}_i \leq 1, \tilde{x}_i \in \tilde{X} \\ r = \frac{t_i}{N}, t_i \in \mathbb{N} \end{cases},$$

where $t_i$ are the depth steps along the respective well, and N is a constant factor to regularize the span of the polar coordinate system,
generating a matrix G defined by $$G = \begin{bmatrix} \cos(\phi(x_1) + \phi(x_1)) & \cdots & \cos(\phi(x_1) + \phi(x_n)) \\ \cos(\phi(x_2) + \phi(x_1)) & \cdots & \cos(\phi(x_2) + \phi(x_n)) \\ \vdots & \ddots & \vdots \\ \cos(\phi(x_n) + \phi(x_1)) & \cdots & \cos(\phi(x_n) + \phi(x_n)) \end{bmatrix}.$$

9. The method according to claim 1, wherein a multivariate data reduction is used to reduce the dimension of the depth intervals.

10. The method according to claim 9, wherein multivariate data reduction comprises principal component analysis (PCA).

11. The method according to claim 2, wherein the 2D EM clustering comprises a filtering part, and a clustering part.

12. The method according to claim 1, wherein clustering the matrices comprises k-means algorithm.

13. The method according to claim 1, wherein clustering the matrices is performed by machine learning (ML).

14. The method according to claim 1, wherein the spatial partitioning of the cluster ensemble comprises an inverse distance algorithm or an advanced spatial interpolation method.

15. The method according to claim 14, wherein, such inverse distance algorithm comprises indicator kriging using an indicator function.

* * * * *